UNITED STATES PATENT OFFICE.

EDSON BRADLEY, OF WASHINGTON, DISTRICT OF COLUMBIA.

PROCESS OF PREPARING CHARRED WHISKY-BARRELS FOR REUSE.

No. 887,375.     Specification of Letters Patent.     Patented May 12, 1908.

Application filed September 16, 1907. Serial No. 393,146.

*To all whom it may concern:*

Be it known that I, EDSON BRADLEY, a citizen of the United States, and resident of Washington, District of Columbia, have invented certain new and useful Improvements in a Process for Preparing Charred Whisky-Barrels for Reuse, of which the following is a specification.

My invention relates to a process for preparing charred whisky barrels for re-use, and has for its object to provide a course of treatment whereby charred barrels, once used as containers for whisky, may be renovated for re-use.

My invention has particular relation to the treatment of containers for regularly distilled American whiskies made and stored in bond. The barrels used as such containers for this class of American whiskies have always been constructed of white oak, a material the supply whereof has been constantly diminishing, and which is now very scarce. The interiors of such containers have always been charred for the two-fold purpose of coloring the whisky and to impart to the contents the taste and smell of charred oak wood, which form essential portions of the flavor and aroma peculiar to American whiskies.

The rich characteristic color of regularly distilled American whiskies made and stored in bond is derived entirely from the partially burned and roasted oak wood just beneath the charcoal of the charred interior surface of the barrel. The distinguishing characteristics as to color, taste and smell imparted to American whiskies by the aforesaid means have become so identified therewith as to form essential parts of the whisky. These containers once having been used have heretofore been incapable of re-use as containers for the regularly distilled whisky made and stored in bond originally contained therein; and once used they have been discarded or used only for inferior and rectified whisky. The barrel from which the color has once been extracted by the storage of whisky has heretofore been incapable of again coloring whisky to a degree darker than a light straw color; and whisky of that color would be unmarketable; such barrels once used, moreover, are incapable of imparting the desired flavor to whisky stored therein. To meet the requirements of the art, therefore, and to so renovate said barrels as to adapt them to re-use, I have invented the following process.

The heads are first removed from the barrel. The barrel is then kiln-dried at a comparatively low degree of temperature, and for a considerable time; twenty-four to thirty-six hours having been determined in my experiments to be necessary to accomplish the best results. By this long continued kiln-drying process all of the moisture remaining in the charred surface and in the contiguous particles of the natural wood underneath the charred surface is driven out. The barrels having thus been thoroughly kiln dried are recharred; the heads replaced therein and the barrel is then ready to be re-used as a container for whisky of the same class as its original contents. The heads of the barrels may also be kiln-dried and recharred if desired, but I have found that this weakens the heads and that there is no appreciable gain in the color of the whisky or other advantage to compensate therefor. I therefore recommend that the old heads be re-used without drying or re-charring. The barrel thus renovated will not only color and flavor its contents just as when it was first used for its original contents, but will also impart to the new whisky the flavor of the whisky which it originally contained; thus improving the quality of its second contents and hastening the maturity thereof In the efforts heretofore made in the prior art to repair whisky barrels for re-use, it has been frequently attempted to re-char such barrels. Barrels which have once been used, when empty are thoroughly whisky soaked and will not dry out by exposure to the atmosphere in many months; sometimes two to three years are required before the particles at the bottom of the charred surface have become sufficiently dry to enable the barrel to be re-charred; the necessary storage of such barrels during the period necessary to accomplish such evaporation and drying has been accomplished at a prohibitive cost, in addition to which, by the time such drying by atmospheric exposure has been accomplished, the barrels have become twisted and the staves shrunken, so that the barrel is unsound and unfit for use, and likely to fall apart in the process of handling.

Having fully described my invention, what I claim as new and desire to have secured to me by the grant of Letters Patent, is:

1. A process for preparing charred whisky barrels for re-use consisting of the removal of the heads from the shell of the barrel, kiln drying the shell and re-charring the inner surface of the shell, substantially as described.

2. A process for preparing charred whisky barrels for re-use consisting of the removal of the heads from the shell of the barrel, kiln drying the shell for a period of thirty-six hours, and re-charring the inner surface of the shell, substantially as described.

In testimony whereof, I have signed my name to this specification, in presence of two subscribing witnesses.

EDSON BRADLEY.

Witnesses:
 JAMES L. HOPKINS,
 WALTER C. STEIN.